Dec. 19, 1950     C. W. WIPRUD     2,535,005
DENTAL APPLIANCE
Filed June 3, 1948     3 Sheets-Sheet 2
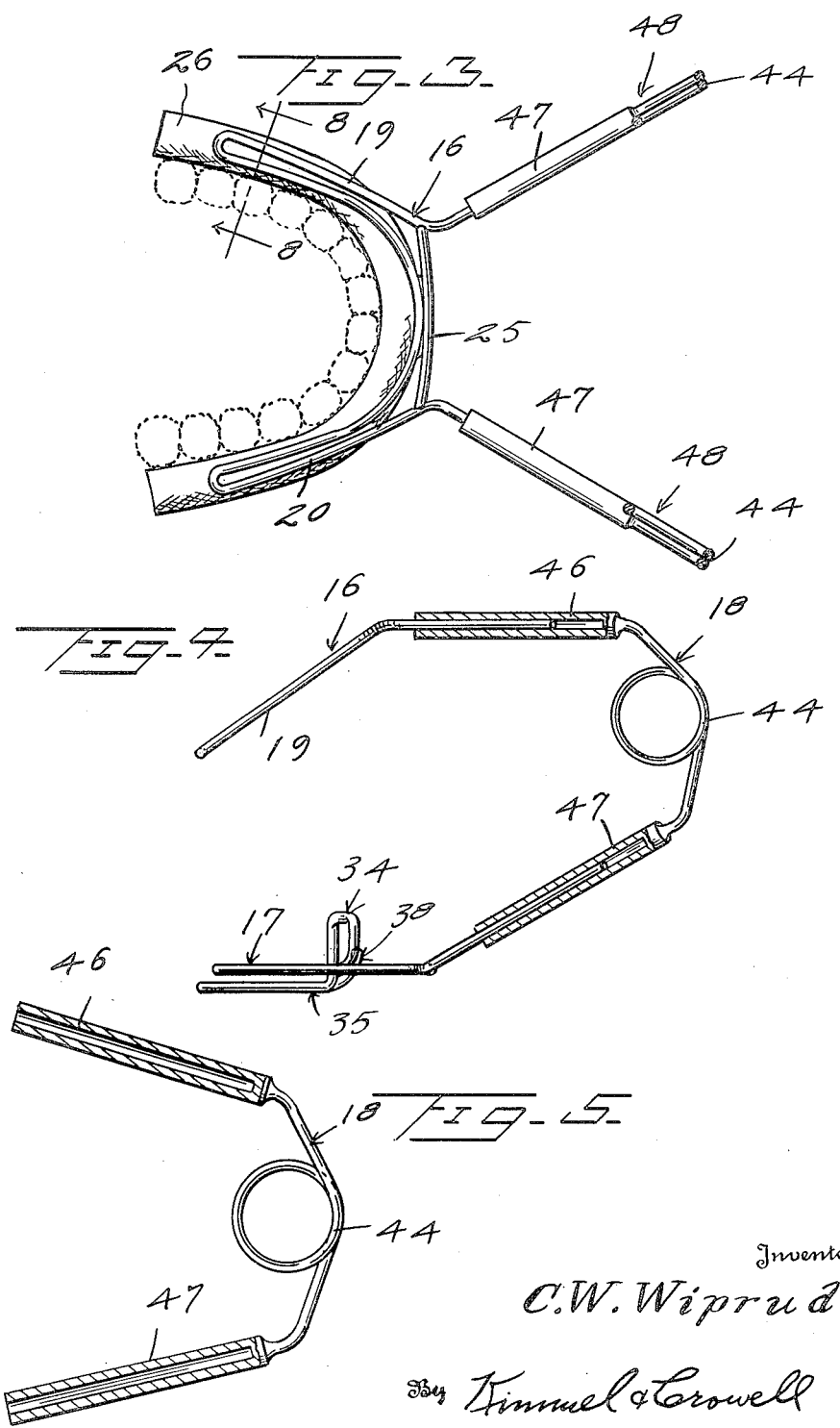

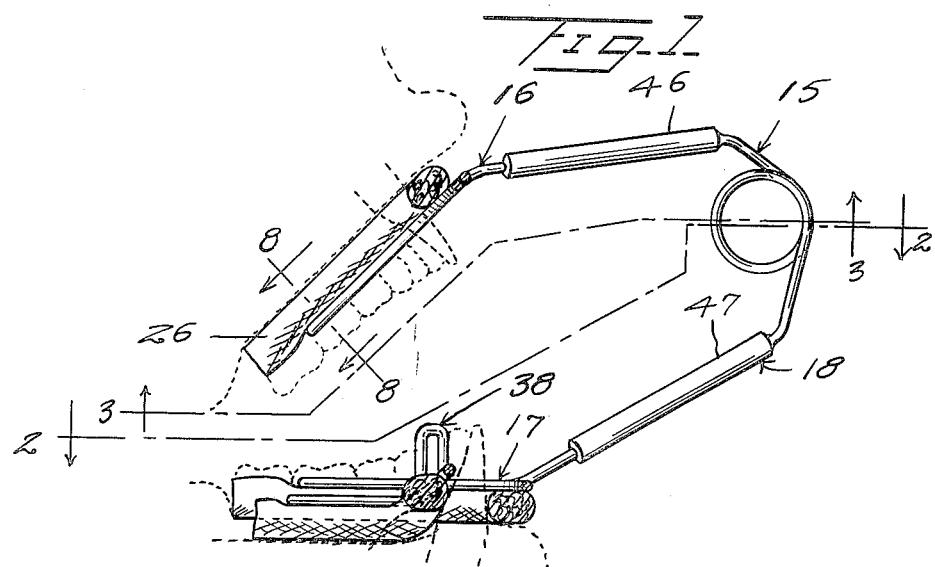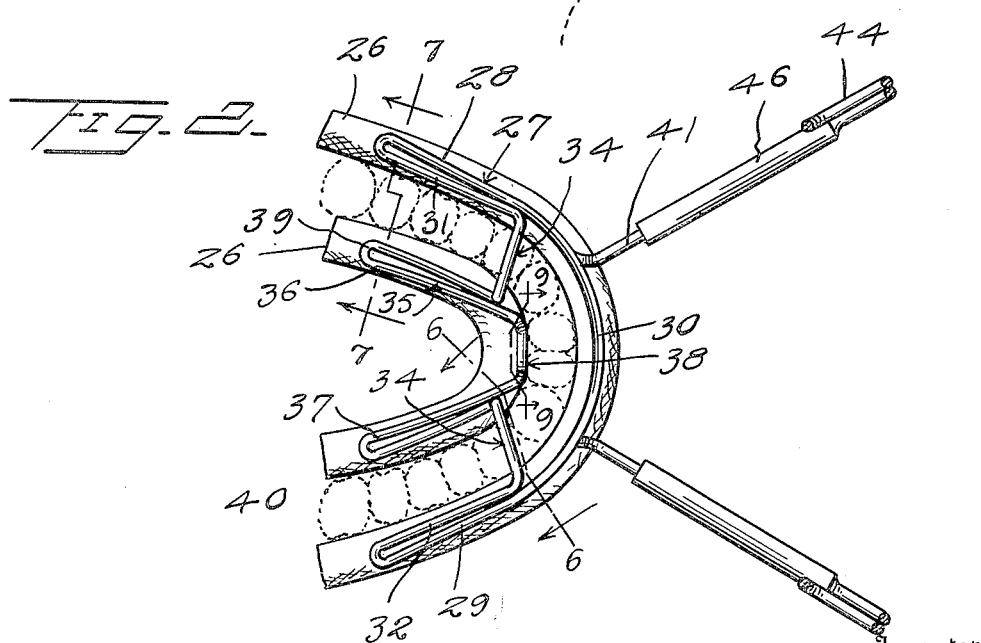

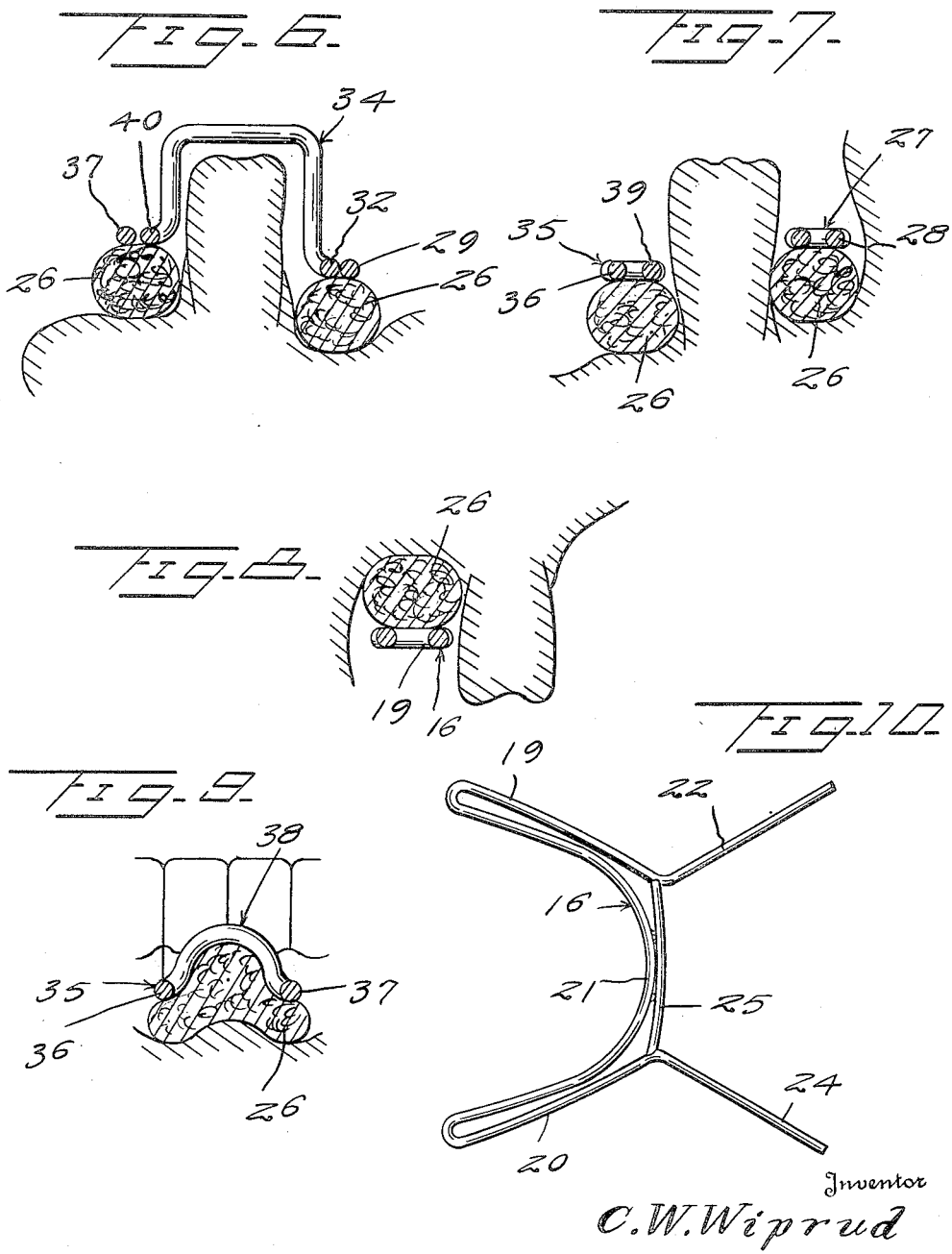

Patented Dec. 19, 1950

2,535,005

UNITED STATES PATENT OFFICE 2,535,005

DENTAL APPLIANCE

Clarence W. Wiprud, Corvallis, Oreg.

Application June 3, 1948, Serial No. 30,831

6 Claims. (Cl. 32—35)

This invention relates to dental appliances and more particularly to an improved "isolater" and lip retractor.

It is an object of this invention to provide a dental appliance of the kind to be more particularly described hereinafter which will isolate the teeth from the fluids which are normally in the mouth of a patient. By the use of this appliance all the teeth may be dried and kept dry for a sufficient length of time required for a particular dental operation.

Another object of this invention is to provide an appliance which will retract the lips of a patient to provide an easy approach into the mouth by the dentist.

The principal purpose of this appliance is to hold cotton rolls around all the teeth at one time to keep the teeth dry in the administration of fluorine by dentists for the prevention of dental decay. This device will enable the dentist to dehydrate all the teeth and apply the required medications for the required length of time in one operation. It has been the practice to apply the medication to one small portion of the mouth at one time, and with the use of this appliance much valuable time is saved and the operation is made much easier for both the dentist and patient.

Another object of this invention is to provide an improved appliance of this kind to keep the field of operation free from moisture in the treatments of pyorrhea, gingivitis, Vincent's infection and other dental disturbances.

A further object of this invention is to relieve the tiring strain on many patients resulting from the effort to keep their mouth open wide enough to permit the dentist to work freely.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings:

Figure 1 is a longitudinal section through a dental appliance constructed according to an embodiment of this invention.

Figure 2 is a horizontal section taken on the line 2—2 of Figure 1.

Figure 3 is a horizontal section taken on the line 3—3 of Figure 1.

Figure 4 is a side elevation partly in section.

Figure 5 is a longitudinal section through the spring member of the device.

Figure 6 is a fragmentary detailed section taken on the line 6—6 of Figure 2.

Figure 7 is a fragmentary detailed section taken on the line 7—7 of Figure 2.

Figure 8 is a detailed section taken on the line 8—8 of Figure 1.

Figure 9 is a detailed section taken on the line 9—9 of Figure 2.

Figure 10 is a top plan view of the upper U-shaped pad supporting member removed from the device.

Referring to the drawings, the numeral 15 designates generally a dental appliance for supporting cotton pads and the like between the teeth and gums of a dental patient to permit the ready access of the dentist to the teeth. The dental appliance 15 exerts a slight spring tension between the upper and lower teeth between the teeth and the gums for holding a pad of cotton and for assisting the patient in supporting his jaws open while the dentist is performing the necessary operations.

The appliance 15 comprises an upper U-shaped member 16 for engagement between the upper teeth and the lips, a lower member 17 for engagement between the lower teeth and the lips and a spring member 18 which is connected between both of the pad supporting members 16 and 17. The upper supporting member 16 is substantially U-shaped in configuration as shown in Figure 10 being formed preferably of a length of wire bent to the desired shape. The member 16 comprises a pair of side arms 19 and 20 which are connected together by a bight portion 21. The member 16 is formed of a single length of wire bent upon itself to provide the arms 19 and 20 which are doubled throughout their length as the wire is reverted at the terminal ends thereof.

Supporting arms as 22 and 24 are fixed to or formed on the free ends of the length of wire at the point where the wire is bent to define the bight portion of the member 16. The arms 22 and 24 extend forwardly from the bight portion of the member and provide for attachment to the spring as will be hereinafter described. A fixed supporting bar 25 is fixed between the ends of the supporting arms 22 and 24 immediately adjacent the bight portion 21 for stiffening and strengthening the member at this portion. The U-shaped member 16 is adapted for positioning between the upper teeth and the upper lip for holding the lips away from the teeth and for separating the teeth from the saliva and other moisture which accumulates in the mouth of the patient. A lower U-shaped member as 27 is provided for supporting a cotton pad between the lower teeth and lips of the patient and for depressing the tongue during the dental operation. The lower U-shaped member 27 is also formed of a single length of wire bent upon itself to the desired configuration.

The member 27 includes a pair of side arms 28 and 29 which are connected together by an arcuate bight portion 30. The arms 28 and 29 are disposed in an outwardly divergent relation one to the other converging at the bight portion 30. The member 27 is formed of a single length of wire and the wire is reverted at the divergent terminal ends of the arms 28 and 29 to form the return arms 31 and 32. The arms 31 and 32 extend substantially parallel along the length of the arms 28 and 29 to a position adjacent the connection between the arms 28 and 29 to the bight portion 30. The wire is then bent upwardly at right angles to the plane of the member 27 and reverted to form a U-shaped connecting member 34 for arching over the lower teeth. A tongue depressing member as 35 is connected to the U-shaped member 27 by the U-shaped or arched members 34. The tongue depressing member 35 is U-shaped and formed as a continuation or integral with the wire which defines the pad supporting member 27. The tongue depressing member 35 includes a side arm 36 and 37 and a bight portion 38 connecting the arms 36 and 37 at their forward end. The arms 36 and 37 are reverted at their free divergent ends to provide connecting arms 39 and 40 which extend substantially parallel to the arms 36 and 37 forwardly from the extreme rear end thereof. The arms 39 and 40 connect to the lower end of the U-shaped connecting members 34 which are fixed to the reverted arms 31 and 32 of the side arms 28 and 29 of the pad supporting member 27. The bight portion 38 of the tongue depressing member 35 is upwardly offset from the plane of the arms 36 and 37 as clearly shown in Figure 9 of the drawings.

Forwardly extending supporting arms 41 and 42 are fixed to the front end of the U-shaped member 27 and extend forwardly therefrom. The arms 41 and 42 are fixedly secured to the bight portion 30 of the member 27.

A spring member 18 connects the upper and lower pad supporting members 16 and 17 together forwardly thereof. The spring member 18 is formed of a pair of coiled springs 44 and 45 having divergent terminal ends. Tubular supporting members as 46 and 47 are fixed to the divergent ends of the springs. The tubular supporting members 46 and 47 extend rearwardly from the coiled springs 44 and 45 in a rearwardly divergent relation. The coiled spring 44 constantly urges the divergent ends of the tubular members 46 and 47 apart. The supporting arms 22 and 24 of the upper pad supporting member 16 are adapted to slidably engage within the tubular members 46 at the upper end of the springs. The forwardly extending arms 41 and 42 of the lower pad supporting member 27 are adapted to slidably engage within the tubular members 46 on the lower side of the springs 44 and 45. The tubular members 46 and 47 are, therefore, telescopically engaging the supporting arms of the upper and lower pad supporting members 16 and 27.

In the use and operation of the isolater or lip retractor described above the pad supporting members are spring-pressed as close together as possible for insertion into the mouth of the patient between the teeth and lips. The cotton pads are positioned between the teeth and lips of the upper and lower jaws and a pad may be positioned behind the lower teeth. The pad supporting members are then permitted to be pressed apart by the action of the spring for supporting the pads in their selected positions and the spring tension of the springs 44 will press the pad supporting members in place so that the teeth will be substantially free from the lips and the pads will absorb any of the moisture in the mouth thereby permitting the dentist to operate on the teeth in a dry condition.

For securely positioning the pad supporting members in place the supporting arms 41 and 42 of the lower supporting member 27 are disposed at an upwardly extending angle relative to the plane of the arms 28 and 29. The supporting arms 22 and 24 of the upper pad supporting member 16 are disposed in a downwardly inclined direction relative to the plane of the arms 19 and 20 in such a manner that the tension of the spring 44 exerted on the supporting arms will press the supporting members 16 and 27 firmly against the cotton pads throughout their length.

I claim:

1. A dental appliance for supporting a pad between the lips and teeth of a patient comprising a U-shaped upper member for engagement between the upper teeth and lips, a U-shaped lower member for engagement between the lower teeth and lips, a tongue depressing member fixed on said lower member and spaced inwardly therefrom for disposition inwardly of the lower teeth, a pair of forwardly extending arms on each of said upper and lower members and disposed at an obtuse angle relative thereto, and a spring between said arms constantly urging said upper and lower members apart.

2. A dental appliance for supporting a pad between the lips and teeth of a patient comprising a substantially U-shaped upper member for engagement between the upper teeth and lips, a pair of forwardly extending arms fixed to the bight portion of said member, a substantially U-shaped lower member for engagement between the lower teeth and lips, a pair of forwardly extending arms fixed to the bight portion of said latter member, a tongue depressing member, a connecting bar fixed between said latter member and said tongue depressing member, said upper and lower members being disposed in diverging relation with the bight portions thereof furthest apart, and spring means constantly urging said upper members into spaced apart relation.

3. A lip retractor comprising a pair of diverging substantially U-shaped members for engagement between the teeth and lips of a patient, forwardly extending converging supporting arms on said members, a spring member, and divergent tubular members on said spring member for detachable engagement with the forwardly extending arms of said first mentioned members.

4. A dental appliance for supporting a pad between the teeth and lips of a patient comprising a pair of substantially U-shaped members for engagement between the teeth and lips of a patient disposed in diverging relationship with the bight portions thereof furthest apart, forwardly extending converging supporting arms on said bight portions of said members, a spring member, diverging arms on said spring member, and telescoping means slidably connecting said latter diverging arms with said forwardly extending converging arms for constantly urging said members into spaced relation one to the other.

5. A dental appliance for supporting a pad between the teeth and lips of a patient comprising a pair of substantially U-shaped members for engagement between the teeth and lips of a patient disposed in diverging relationship with the bight portions thereof furthest apart, forwardly extending converging supporting arms on said bight portions of said members, a spring member, diverging arms on said spring member, telescoping means slidably connecting said latter diverging arms with said forwardly extending converging arms for constantly urging said members into spaced relation one to the other, a tongue depressing member, and an upwardly offset connecting bar fixed between the lower one of said U-shaped members and said tongue depressing member.

6. A dental appliance for supporting a pad between the teeth and lips of a patient comprising a pair of substantially U-shaped members for engagement between the teeth and lips of a patient disposed in diverging relationship with the bight portions thereof furthest apart, forwardly extending converging supporting arms on said members, a spring member, diverging arms on said spring member, telescoping means slidably connecting said latter diverging arms with said forwardly extending converging arms for constantly urging said members into spaced relation one to the other, a U-shaped tongue depressing member including an upwardly offset bight portion, and an inverted U-shaped connecting bar between said tongue depressing member and the lower of said first mentioned members.

CLARENCE W. WIPRUD.

REFERENCES CITED

The following references are of record in the file of this patent:

UNITED STATES PATENTS

| Number | Name | Date |
| --- | --- | --- |
| 152,074 | Chevalier | June 16, 1874 |
| 641,170 | Thurmond et al. | Jan. 9, 1900 |
| 1,229,595 | DuBrill | June 12, 1917 |
| 1,813,650 | Whitlock | July 7, 1931 |